United States Patent
Hintze et al.

(10) Patent No.: US 12,111,220 B2
(45) Date of Patent: Oct. 8, 2024

(54) SENSOR ASSEMBLY FOR SENSING A STEERING TORQUE AND AN ABSOLUTE ANGULAR POSITION, AND SENSOR DEVICE HAVING SAID SENSOR ASSEMBLY

(71) Applicant: Schaeffler Technologies AG & Co. KG, Herzogenaurach (DE)

(72) Inventors: Matthias Hintze, Dettendorf (DE); Bernd Wittmann, Pommersfelden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 315 days.

(21) Appl. No.: 17/625,843

(22) PCT Filed: Jun. 3, 2020

(86) PCT No.: PCT/DE2020/100460
§ 371 (c)(1),
(2) Date: Jan. 10, 2022

(87) PCT Pub. No.: WO2021/004567
PCT Pub. Date: Jan. 14, 2021

(65) Prior Publication Data
US 2022/0260438 A1    Aug. 18, 2022

(30) Foreign Application Priority Data

Jul. 10, 2019 (DE) .......................... 102019004741.9
Sep. 17, 2019 (DE) .......................... 102019124973.2

(51) Int. Cl.
*G01L 3/10* (2006.01)
*B62D 6/10* (2006.01)
(Continued)

(52) U.S. Cl.
CPC ................ *G01L 3/102* (2013.01); *B62D 6/10* (2013.01); *B62D 15/0215* (2013.01);
(Continued)

(58) Field of Classification Search
CPC ......... G01L 3/102; G01L 3/104; G01L 5/221; G01D 2205/28; G01D 2205/26; G01D 5/2053; B62D 6/10; B62D 15/0215
See application file for complete search history.

(56) References Cited

U.S. PATENT DOCUMENTS 5,481,188 A * 1/1996 Mizutani .................. G01B 7/02
                                                         324/660
5,930,905 A    8/1999 Zabler et al.
(Continued)

FOREIGN PATENT DOCUMENTS

CN    1175999      3/1998
CN    105324292    2/2016
(Continued)

*Primary Examiner* — Octavia Hollington
(74) *Attorney, Agent, or Firm* — Volpe Koenig

(57) ABSTRACT

A steering element sensor assembly for sensing a steering torque and an absolute angular position having a circuit board and first and second sensor elements. The circuit board has a base surface arranged perpendicularly to a steering axis and a wing surface angled to the base. The first sensor element determines the steering torque and has a first primary sensor formed as a magnetically coded portion on the steering element and one secondary sensor for converting the changing magnetic field generated by the primary sensor into an electrical signal. The secondary sensor determines the absolute angular position and a main gear arranged on the steering element that meshes with at least two gears, one which has one more tooth than the other. Each gear has a target that faces a respective angle sensor.

18 Claims, 2 Drawing Sheets

(51) Int. Cl.
  *B62D 15/02* (2006.01)
  *G01D 5/20* (2006.01)
  *G01L 5/22* (2006.01)
(52) U.S. Cl.
  CPC ............ *G01D 5/2053* (2013.01); *G01L 5/221* (2013.01); *G01D 2205/26* (2021.05)

(56) References Cited

U.S. PATENT DOCUMENTS

| | | |
|---|---|---|
| 6,507,188 B1 | 1/2003 | Dilger et al. |
| 6,578,437 B1 | 6/2003 | Maerbe |
| 6,758,105 B2 * | 7/2004 | Viola ............... G01L 3/102 |
| | | 73/862.331 |
| 11,486,778 B2 * | 11/2022 | Liang ............... G01L 5/221 |
| 2014/0292315 A1 * | 10/2014 | Antoni ............ B62D 15/0215 |
| | | 324/207.25 |
| 2018/0031431 A1 * | 2/2018 | Wang ................. G01D 5/00 |
| 2022/0326048 A1 * | 10/2022 | Lindenmayr .......... G01D 5/145 |
| 2022/0355863 A1 * | 11/2022 | Lindenmayr ...... B62D 15/0225 |

FOREIGN PATENT DOCUMENTS

| | | | |
|---|---|---|---|
| DE | 4409892 | 9/1995 | |
| DE | 19506938 | 8/1996 | |
| DE | 19855960 | 6/2000 | |
| DE | 10046660 | 11/2001 | |
| DE | 102014213841 A1 * | 1/2016 | ............... G01L 3/10 |
| DE | 102017130075 | 6/2019 | |
| DE | 102017130075 A1 * | 9/2019 | |
| DE | 102018110553 | 11/2019 | |
| JP | 4780321 B2 * | 9/2011 | |
| WO | 2014037273 | 3/2014 | |
| WO | 2016127988 | 8/2016 | |

* cited by examiner

SENSOR ASSEMBLY FOR SENSING A STEERING TORQUE AND AN ABSOLUTE ANGULAR POSITION, AND SENSOR DEVICE HAVING SAID SENSOR ASSEMBLY

CROSS-REFERENCE TO RELATED APPLICATIONS

This application is the U.S. National Phase of PCT Appln. No. PCT/DE2020/100460, filed Jun. 3, 2020, which claims priority from German Patent Application No. 10 2019 004 741.9, filed Jul. 10, 2019, and German Patent Application No. 10 2019 124 973.2, filed Sep. 17, 2019, the entire disclosures of which are incorporated by reference herein.

TECHNICAL FIELD

The present disclosure relates to a sensor arrangement for sensing a steering torque and an absolute angular position of a steering element, wherein the steering element can be, for example, a steering shaft or part of a steering wheel of a motor vehicle. The disclosure also relates to a sensor device with a sensor arrangement for sensing a steering torque and an absolute angular position of a steering element.

BACKGROUND

WO 2016/127988 A1 shows an arrangement for measuring a force or a torque on a machine element extending in an axis. The force or the torque acts on the machine element, which leads to mechanical stresses and the machine element is slightly deformed. The machine element has at least two magnetization regions extending circumferentially around the axis, each for a magnetization formed in the machine element. The magnetization regions each form a primary sensor for determining the force or the torque. The arrangement further comprises at least a first magnetic field sensor, a second magnetic field sensor and a third magnetic field sensor, which each form a secondary sensor for determining the force or the torque. The primary sensors, i.e., the magnetization regions, are used to convert the torque to be measured into a corresponding magnetic field, while the secondary sensors enable this magnetic field to be converted into electrical signals. The magnetic field sensors are each designed for the individual measurement of a directional component of a magnetic field caused by the magnetization or by the force or the torque. The magnetic field occurs due to the inverse magnetostrictive effect. The magnetic field sensors are arranged to be facing the machine element, wherein preferably only a small radial distance is present between the magnetic field sensors and an inner or outer surface of the machine element. The magnetic field sensors can be arranged in pairs at the same position, for example on a front and a rear side of a circuit board.

Currently, flat standard boards are generally used for magnetic field sensors. Since the magnetostrictive measuring principle only works and delivers reliable measured values up to a certain distance between the primary sensor and secondary sensor or between the passive and active sensor, the magnetic field sensors should be placed as close as possible to the magnetization regions of the component. The magnetic field sensors are therefore placed as far as possible outside on the edge of the board to get as close as possible to the primary sensor. However, it is not always possible to place components close to the edge, since predetermined board design rules prescribe a minimum distance between the board edge and the components to be placed on the board. As a result, the distance between the primary sensor and secondary sensor can become too great so that this sensor principle only works poorly or not at all. There are also restrictions due to certain installation space requirements.

A torque sensor arrangement and a roll stabilizer with this arrangement are described in a patent application DE 10 2018 110 553 by the applicant that was not yet published at the time of filing. The torque sensor arrangement comprises at least one primary sensor, which is designed as a magnetically encoded section of a machine element. The torque on the machine element is to be sensed, wherein the machine element preferably is a flange of a roll stabilizer on a motor vehicle. A secondary sensor is formed on a circuit board facing the primary sensor. The secondary sensor converts changes in the magnetic field of the primary sensor into an electrical signal. The board has a flat base surface with a surface running at an angle thereto. The angled surface carries the secondary sensor and faces the primary sensor. An optimal distance between the primary sensor and the secondary sensor can be formed and selected. The angled surface can be referred to as the wing of the circuit board.

DE 44 09 892 A1 describes a sensor for sensing a steering angle of a vehicle. The sensor comprises a first code disc which is scanned by a number of sensors, for example magnetic Hall barriers. The first code disc rotates at the same speed as a steering wheel. The sensor also has a second code disc which rotates at a quarter of the speed of the first code disc. The ratio of the speeds of the two code discs to one another can be selected. The second code disc has three code tracks which are scanned by sensors. The generated fine and coarse signals are linked appropriately to determine the angle.

From DE 195 06 938 A1, a method and a device for angle measurement in a rotatable body are known, in particular a body rotatable by more than 360°. At least two further rotatable bodies are arranged on the rotatable body, wherein the bodies interact with one another. For example, the rotatable bodies are gears or ring gears, the teeth or angle marks of which mesh with one another. The method provides that the angular positions of the additional bodies are determined by means of additional sensors. The angular position of the first rotatable body is determined from the determined angular positions of the rotatable bodies. Each rotatable body has a predetermined number of teeth, wherein the number of teeth of the further rotatable body differ from the number of teeth of the first rotatable body. This publication also describes the method for evaluating the sensor signals and determining the angular position, to which reference is made explicitly.

In particular when starting motor vehicles that have autonomous driving or assistance systems, it is necessary to know the current steering angle and the steering torque of a steering element, such as a steering shaft. Measurement data stored when the motor vehicle is parked could be deleted or no longer correct due to turning of the steering element when the sensor is switched off so that correct measurement data is not available when the motor vehicle is started.

SUMMARY

Based on the prior art, the object of the present disclosure is to provide a sensor arrangement and a sensor device which make it possible to determine both a steering torque and an absolute angular position of a rotatable machine part during a multi-turn, especially when a motor vehicle is started. The absolute angular position should be determinable from the actual position of the steering element without first needing to move to a zero position.

This object is achieved by a sensor arrangement and by a sensor device having one or more of the features described herein.

The sensor arrangement according to the disclosure is used to sense a steering torque and an absolute angular position of a steering element extending along an axis. The steering element is, for example, a handlebar or a steering shaft or part of a steering wheel of a motor vehicle or a similar component in the steering path of the motor vehicle. In particular, the sensor arrangement is used to determine a steering torque and an absolute angular position during a multi-turn of the steering element, i.e., for a revolution that is greater than 1 or exceeds 360°. Often the usual steering distances allow at least 2.5 revolutions, starting from a straight-ahead position in each direction or rotation angle of +/−900°. The steering torque can also be referred to as the torque and the absolute angular position as the angle of rotation. To determine the measurement data, the sensor arrangement comprises a circuit board, a first sensor element and a second sensor element. The circuit board has a base surface that is perpendicular to the axis of the steering element. Furthermore, the circuit board comprises at least one surface running at an angle to the base surface. The first sensor element is used to determine the steering torque, which is introduced, e.g., by a driver on the steering element. The first sensor element consists of at least one primary sensor and a secondary sensor facing the primary sensor. The primary sensor generates a magnetic field, wherein said primary sensor is designed as a magnetically encoded section on the steering element. The secondary sensor is used to sense the magnetic field of the primary sensor and to convert this signal into an electrical signal. The secondary sensor facing the primary sensor is arranged on the angled surface of the circuit board. The second sensor element is used to determine the absolute angular position, wherein the second sensor element comprises a main gear arranged on the steering element and at least two further gears as well as an angle sensor arranged on the base surface of the board. A first gear, a second gear, and the main gear are interrelated so that rotations are passed on. The second gear has one more tooth than that of the first gear. Thus, the Vernier principle can be used for sensing. Each gear forms a target or has a target, wherein the target is arranged in such a way that it lies facing the angle sensor arranged on the base surface of the circuit board, so that an absolute angular position can be sensed when the steering element is rotated. The steering torque and the absolute angular position can thus be determined simultaneously by means of the sensor arrangement.

One advantage of the present sensor arrangement is that a multi-turn, that is to say a steering element revolution of more than 360°, and a steering torque can be sensed at the same time. With the sensor arrangement according to the disclosure, it is advantageously possible to measure the steering torque and the absolute angular position immediately when starting a motor vehicle which comprises the steering element with the sensor arrangement. As a result, no reference point or the storage of a rotation of the steering element when the motor vehicle is parked is necessary.

The absolute angular position is preferably determined in a range between −900° and +900° or plus/minus 2.5 revolutions of the steering element, starting from a zero position of the steering element. Accordingly, a measurement is possible in both directions of rotation. Other numbers of revolution are conceivable.

The first sensor element and the second sensor element are preferably arranged to be orthogonal to one another.

The angled surface of the plate is preferably arranged to be parallel to the axis of the steering element. Alternatively, the angled surface of the circuit board is preferably arranged to be parallel to the surface or lateral surface of the steering element so that a small distance between the primary sensor and the secondary sensor is ensured to increase the measurement accuracy. The angled surface of the board is preferably formed to be perpendicular to the base surface of the board.

The circuit board preferably comprises one or more than one angled surface. The circuit board particularly preferably comprises two angled surfaces. Alternatively, the circuit board preferably comprises four angled surfaces. More than four angled surfaces of the circuit board are also conceivable.

The first sensor element uses the effect of inverse magnetostriction. The primary sensor is preferably designed in the form of the magnetically coded section on the outer surface of the steering element so that it faces the secondary sensor at a short distance. Alternatively, the primary sensor can be designed as part of the steering element or integrated into the steering element. For example, the steering element can be a hollow shaft, on the inner diameter of which the primary sensor is arranged.

The secondary sensor located on the angled section of the circuit board is preferably a magnetic field sensor.

If the circuit board has more than one angled surface, the first sensor element can have several secondary sensors. This increases the measurement accuracy.

The second sensor element is designed as an angular rotary encoder. Preferably, the target of each gear is arranged on the gear in the form of a magnet. Alternatively, the gear itself is preferably designed as a target, wherein the gear consists of an electrically conductive material. In one embodiment, the teeth of the gears can also serve as a target.

In one embodiment, the second sensor element has more than two additional gears so that the measurement accuracy can be increased and measurement errors can be reduced. The additional number of gears of the second sensor element should always be a multiple of two. The main gear can also be designed and referred to as a ring gear.

The angle sensor, which is used to sense the absolute angular position or the angle of rotation, is preferably a rotation angle sensor. The angle sensor is particularly preferably an inductive eddy current sensor. Alternatively, the angle sensor is preferably a magnetic sensor. In one embodiment, a combination of an inductive eddy current sensor and a magnetic sensor can be used. In an alternative embodiment, the sensor is an optical sensor that senses the teeth of the gears, for example. Other types of sensors are conceivable. At least one angle sensor is arranged to be facing each of the at least two gears. Other types of sensors, capacitive, resistive, or the like, are conceivable.

The angle sensor can measure with or without contact. The angle sensor is preferably designed to be contactless.

The at least two gears are driven via the main gear, which is arranged on the steering element. The angle information of the gears is sensed by means of the angle sensors and the absolute angular position is determined therefrom.

In a further embodiment, the second sensor element has more than one angle sensor to improve the measurement accuracy and the redundancy. The second sensor element preferably has two angle sensors arranged on the base surface of the board.

In a preferred embodiment, the sensor arrangement also has an evaluation unit which is used to evaluate the sensed measurement data.

The sensor device according to the disclosure comprises a rotatable steering element and a sensor arrangement arranged on the steering element in accordance with the sensor arrangement described above with all the embodiments thereof. The steering element is preferably part of a power steering system. The power steering is particularly preferably an electromechanical power steering.

BRIEF DESCRIPTION OF THE DRAWINGS

Further advantages and details of the present disclosure arise from the following description of preferred embodiments with reference to the attached drawing. In the figures.

DETAILED DESCRIPTION

Figure 1:
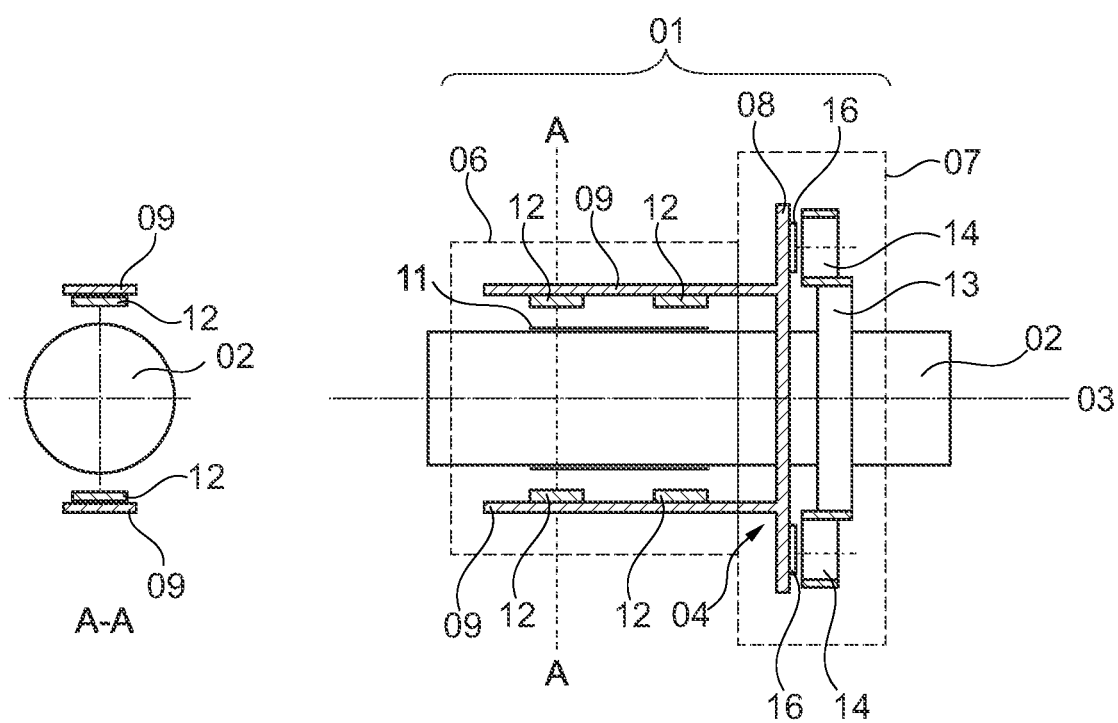
FIG. 1 shows two sectional views of a first embodiment of a sensor device according to the disclosure having a sensor arrangement.

FIG. 1 shows a cross-section and a longitudinal section of a first embodiment of a sensor device according to the disclosure with a sensor arrangement 01 according to the disclosure. The sensor arrangement 01 is used to sense a steering torque and an absolute angular position of a steering element 02, which is typically installed in a motor vehicle. The steering element 02 has an axis 03, which is at the same time an axis of rotation. The sensor device comprises the steering element 02 and the sensor arrangement 01. The steering element 02 can be a steering shaft of a motor vehicle. The sensor arrangement 01 comprises a circuit board 04, a first sensor element 06 for sensing a steering torque and a second sensor element 07 for sensing an absolute angular position. In particular, the sensor arrangement 01 is used to determine the absolute angular position of the steering element 02 when revolutions >1 are possible and to simultaneously determine the turning or steering torque on the steering element 02. The circuit board 04 has a base surface 08 which is arranged on the steering element 02 and is orthogonal to the axis 03 thereof. The plate 04 has two wing surfaces 09 perpendicular to the base surface 08 thereof.

The first sensor element 06 is a torque sensor which has a magnetically encoded section 11 and a magnetic field sensor 12 facing same. The coded section 11 forms a primary sensor and the magnetic field sensor 12 forms a secondary sensor. The magnetic field sensor 12 converts the magnetic field generated by the magnetically encoded section 11 into an electrical signal. The magnetically coded section 11 is preferably formed on the lateral surface of the steering element 02 and the magnetic field sensor 12 is arranged on the radially inner side of the wing surface 09 of the circuit board 04. Two magnetic field sensors 12 are arranged on each of the two wing surfaces 09. The wing surfaces 09 are facing one another.

The second sensor element 07 is an angular rotary encoder and comprises a main gear 13 and two additional gears 14. The main gear 13 is arranged on the steering element 02 to be parallel to the base surface 08 of the circuit board 04. The main gear 13 and the two gears 14 mesh with one another so that rotations of the steering element 02 are transmitted in a translated manner. All gears 13, 14 lie with the main plane of extent thereof parallel to the base surface 08 of the plate 04. The first and second gears 14 have a number of teeth different by one. The two gears 14 are formed at least in sections from an electrically conductive material or from a filler material with good electrical conductivity so that they can function as a target. On the base surface 08 of the circuit board 04, two eddy current sensors 16 are arranged to be facing the two gears 14. An eddy current sensor 16 comprises a receiver coil and excitation coil and senses induced magnetic fields.

The entire sensor arrangement 01 thus works without contact. By means of the angular data ascertained by the eddy current sensor 16 from the additional gears 14, the absolute angular position of the steering element can also be determined in the case of rotations over 360° or revolution greater than one. Advantageously, the steering torque and the absolute angular position of the steering element 02 can be determined simultaneously and promptly with the sensor device according to the disclosure so that no stored data is required when starting a motor vehicle. The current steering torque and the absolute angular position are determined, e.g., when starting the motor vehicle. The sensor device also has an evaluation unit (not shown) for evaluation. In the cross-sectional view AA of FIG. 1, the steering element 02 is shown with the circumferentially distributed, opposite wing surfaces 09, each with a magnetic field sensor. The eddy current sensor 16 is arranged to be facing the gear 14.

Figure 2:
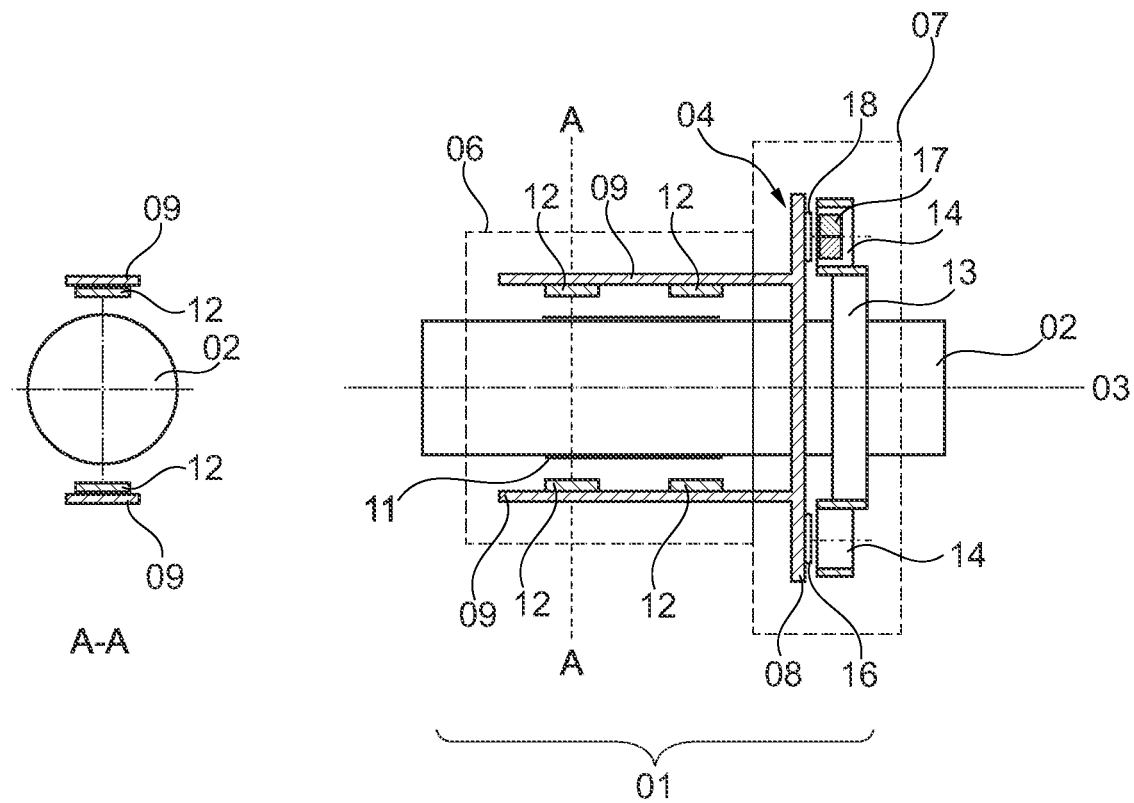
FIG. 2 shows two sectional views of a second embodiment of the sensor device.

FIG. 2 shows a cross-section and a longitudinal section of a second embodiment of the sensor device. The sensor device shown in FIG. 2 is initially similar to the sensor device shown in FIG. 1. In contrast to FIG. 1, the sensor device shown in FIG. 2 has an alternative second sensor element 07, which has a combination of the angle sensor 16 and a target 17 in the form of a magnet with an associated magnetic sensor 18. One target 17 is arranged on one of the two gears 14, wherein the target 17 faces the magnetic sensor 18 fastened on the base surface 08 of the circuit board 04. The magnetic sensor 18 senses the magnetic field generated by the target 17 to determine the absolute angular position of the steering element 02.

Figure 3:
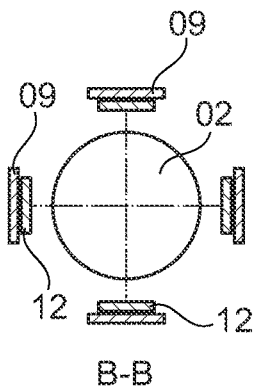
FIG. 3 shows two sectional views of a third embodiment of the sensor device.
Figure 3:
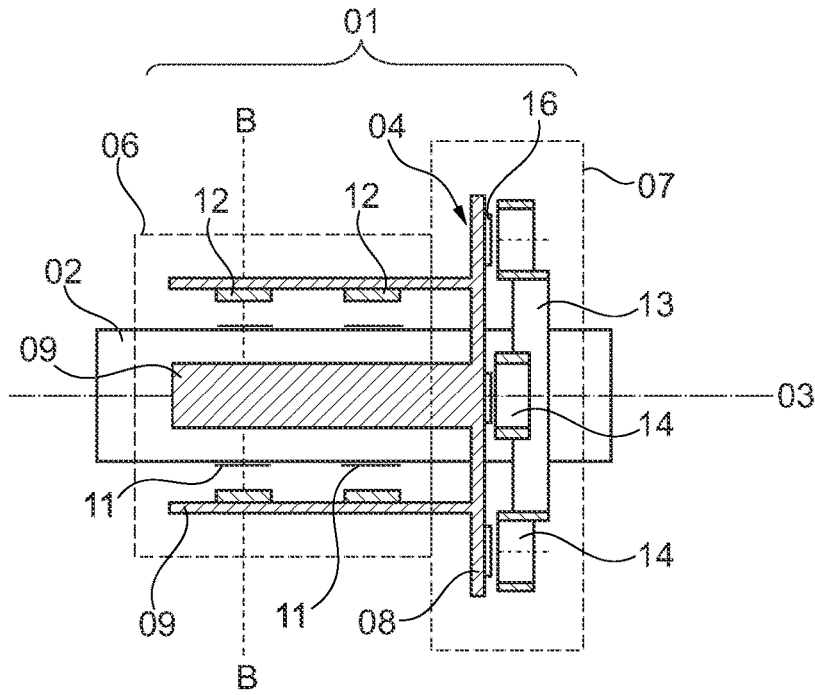

FIG. 3 shows a cross-section and a longitudinal section of a third embodiment of the sensor device, which is initially the same as the sensor device shown in FIG. 1. In contrast to FIG. 1, the sensor device shown in FIG. 3 has a circuit board 04 with four instead of two wing surfaces 09. Two magnetic field sensors 12 are arranged on each of the four wing surfaces 09 of the circuit board 04. The wing surfaces 09 are each arranged to be offset by 90° around the steering element 02, which is illustrated in the cross-sectional view BB. In each case two wing surfaces 09 are facing one another. Furthermore, the sensor device shown in FIG. 3 differs from the sensor device shown in FIG. 1 in that the second sensor element according to the embodiment shown in FIG. 3 has four gears 14. The four gears 14 mesh with the main gear 13 and consist at least in sections of an electrically conductive material.

Figure 4:
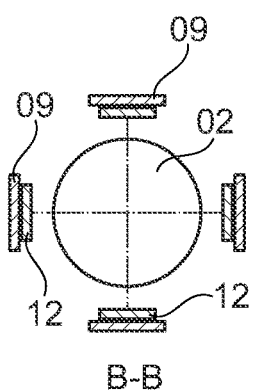
FIG. 4 shows two sectional views of a fourth embodiment of the sensor device.
Figure 4:
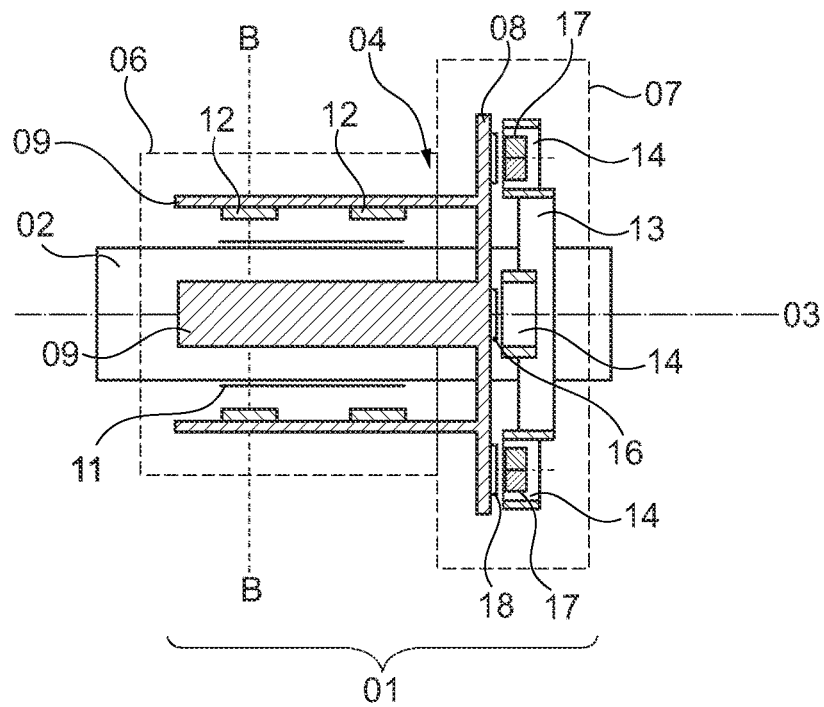

FIG. 4 shows a cross-section and a longitudinal section of a fourth embodiment of the sensor device, which is initially the same as the sensor device shown in FIG. 2. In contrast to FIG. 2, the sensor device shown in FIG. 4 has a circuit board 04 with four instead of two wing surfaces 09. Two magnetic field sensors 12 are arranged on each of the four wing surfaces 09 of the circuit board 04. The wing surfaces 09 are each arranged to be offset by 90° around the steering element 02, which is illustrated in the cross-sectional view BB. In each case two wing surfaces 09 are facing one another. Furthermore, the sensor device shown in FIG. 4 differs from the sensor device shown in FIG. 2 in that the second sensor element according to the embodiment shown in FIG. 4 has four gears 14. The four gears 14 mesh with the main gear 13. Two opposing gears 14 have a target 17 on the lateral surface thereof facing the plate 04. Each target 17 is arranged to be facing a magnetic sensor 18. The other two gears 14 interact inductively with the angle sensor 16. Thus, a combination of different sensor applications is shown.

LIST OF REFERENCE SYMBOLS

01 Sensor arrangement
02 Steering element
03 Axis
04 Circuit board
06 First sensor element
07 Second sensor element
08 Circuit board base surface
09 Wing surface
11 Magnetically encoded section
12 Magnetic field sensor
13 Main gear
14 Gear
16 Eddy current sensor
17 Target
18 magnetic sensor

The invention claimed is:

1. A sensor arrangement for sensing a steering torque and an absolute angular position of a steering element extending along an axis, the sensor arrangement comprising:
 a circuit board with a base surface arranged perpendicularly to the axis and at least one wing surface extending at an angle to the base surface;
 a first sensor element for determining the steering torque, the first sensor element including at least one first primary sensor formed as a magnetically encoded section on the steering element and a secondary sensor facing the first primary sensor configured to convert a change in a magnetic field generated by the primary sensor into an electrical signal, the secondary sensor being arranged on the radially inner side of the angled wing surface of the circuit board, facing the primary sensor; and
 a second sensor element for determining the absolute angular position, the second sensor element comprising a main gear arranged on the steering element that meshes with at least two gears, one of the two gears has one more tooth than an other of the two gears, and at least one target is formed on each of the two gears, which is located facing an angle sensor arranged on the base surface of the circuit board.

2. The sensor arrangement according to claim 1, wherein the first sensor element and the second sensor element are arranged to be orthogonal to one another.

3. The sensor arrangement according to claim 1, wherein the sensor arrangement is configured to determine the steering torque and the absolute angular position during a multi-turn of the steering element.

4. The sensor arrangement according to claim 1, wherein the circuit board has two or four of the wing surfaces that extend at an angle to the base surface.

5. The sensor arrangement according to claim 1, wherein the secondary sensor of the first sensor element comprises a magnetic field sensor.

6. The sensor arrangement according to claim 1, wherein the magnetically encoded section of the primary sensor of the first sensor element is arranged on an outer surface of the steering element.

7. The sensor arrangement according to claim 1, wherein the steering element is a handlebar or a steering shaft or part of a steering wheel.

8. The sensor arrangement according to claim 1, wherein the at least two gears comprises more than two of the gears, and a number of the gears of the second sensor element is a multiple of two.

9. A sensor device comprising a rotatable steering element and the sensor arrangement according to claim 1 coupled to the steering element.

10. The sensor device according to claim 9, further comprising an evaluation unit.

11. A sensor arrangement for sensing a steering torque and an absolute angular position of a steering element extending along an axis, the sensor arrangement comprising:
 a circuit board with a base surface arranged perpendicularly to the axis and four wing surfaces extending at an angle to the base surface, parallel to the axis;
 a first sensor element for determining the steering torque, the first sensor element including at least one first primary sensor formed as a magnetically encoded section on the steering element and a secondary sensor facing the first primary sensor configured to convert a change in a magnetic field generated by the primary sensor into an electrical signal, the secondary sensor being arranged on the angled wing surfaces of the circuit facing the primary sensor; and
 a second sensor element for determining the absolute angular position, the second sensor element comprising a main gear arranged on the steering element that meshes with at least two gears, one of the two gears has one more tooth than an other of the two gears, and at least one target is formed on each of the two gears, which is located facing an angle sensor arranged on the circuit board.

12. The sensor arrangement according to claim 11, wherein the first sensor element and the second sensor element are arranged orthogonal to one another.

13. The sensor arrangement according to claim 11, the sensor arrangement is configured to determine the steering torque and the absolute angular position during a multi-turn of the steering element.

14. The sensor arrangement according to claim 11, wherein the secondary sensor of the first sensor element comprises a magnetic field sensor.

15. The sensor arrangement according to claim 11, wherein the magnetically encoded section of the primary sensor of the first sensor element is arranged on an outer surface of the steering element.

16. The sensor arrangement according to claim 11, wherein the steering element is a handlebar or a steering shaft or part of a steering wheel.

17. The sensor arrangement according to claim 11, wherein the at least two gears comprises more than two of the gears, and a number of the gears of the second sensor element is a multiple of two.

18. A sensor arrangement for sensing a steering torque and an absolute angular position of a steering element extending along an axis, the sensor arrangement comprising:
- a circuit board with a base surface arranged perpendicularly to the axis and at least one wing surface extending at an angle to the base surface;
- a first sensor element for determining the steering torque, the first sensor element including at least one first primary sensor formed as a magnetically encoded section on the steering element and a secondary sensor facing the first primary sensor configured to convert a change in a magnetic field generated by the primary sensor into an electrical signal, the secondary sensor being arranged on the angled wing surface of the circuit board facing the primary sensor; and
- a second sensor element for determining the absolute angular position, the second sensor element comprising a main gear arranged on the steering element that meshes with at least two gears, one of the two gears has exactly one more tooth than the other of the two gears, and at least one target is formed on each of the two gears, which is located facing an angle sensor arranged on the base surface of the circuit board.

* * * * *